United States Patent
Feys et al.

(10) Patent No.: US 11,499,321 B2
(45) Date of Patent: Nov. 15, 2022

(54) COVERING AND METHOD FOR PRODUCING COVERINGS

(71) Applicant: Beaulieu International Group NV, Waregem (BE)

(72) Inventors: Jonas Feys, Mariakerke (BE); Pol Lombaert, Nazareth (BE); Leo Bevernage, Avelgem (BE)

(73) Assignee: BEAULIEU INTERNATIONAL GROUP NV, Waregem (BE)

( * ) Notice: Subject to any disclaimer, the term of this patent is extended or adjusted under 35 U.S.C. 154(b) by 0 days.

(21) Appl. No.: 16/724,562

(22) Filed: Dec. 23, 2019

(65) Prior Publication Data

US 2020/0208415 A1 Jul. 2, 2020

Related U.S. Application Data

(63) Continuation of application No. 15/543,374, filed on Jul. 13, 2017, now Pat. No. 10,513,855.

(51) Int. Cl.
| | |
|---|---|
| *E04F 15/22* | (2006.01) |
| *E04F 15/10* | (2006.01) |
| *E04F 13/18* | (2006.01) |
| *E04F 13/08* | (2006.01) |
| *E04C 2/20* | (2006.01) |
| *B32B 37/15* | (2006.01) |

(Continued)

(52) U.S. Cl.
CPC ............ *E04F 15/105* (2013.01); *B32B 27/00* (2013.01); *B32B 27/08* (2013.01); *B32B 27/20* (2013.01); *B32B 37/15* (2013.01); *B44C 1/24* (2013.01); *B44C 5/04* (2013.01); *E04C 2/20* (2013.01); *E04F 13/0894* (2013.01); *E04F 13/18* (2013.01); *E04F 15/02038* (2013.01); *B32B 2307/4026* (2013.01); *B32B 2307/554* (2013.01); *B32B 2471/00* (2013.01); *B44C 5/0461* (2013.01); *E04F 2201/023* (2013.01)

(58) Field of Classification Search
CPC ..... E04F 15/105; E04F 13/18; E04F 13/0894; E04F 15/02038; E04F 2201/023; E04C 2/20; B32B 37/15; B32B 27/20; B32B 27/08; B32B 2307/4026; B32B 27/00; B32B 2471/00; B32B 2307/554; B44C 1/24; B44C 5/04; B44C 5/0461
USPC ........................................ 52/403.1
See application file for complete search history.

(56) References Cited

U.S. PATENT DOCUMENTS 2,116,205 A * 5/1938 Kaufmann ............ B44C 1/1712
156/234
3,560,322 A 2/1971 Magid
(Continued)

FOREIGN PATENT DOCUMENTS

| EP | 1207051 A2 | 5/2002 |
| EP | 1938963 A1 | 7/2008 |

(Continued)

*Primary Examiner* — Basil S Katcheves
(74) *Attorney, Agent, or Firm* — Cermak Nakajima & McGowan LLP; James Creighton Wray

(57) ABSTRACT

The current invention concerns coverings such as a floor covering, wall covering or ceiling covering, said covering comprising at least one substrate and at least one surface layer, said surface layer comprising a print pattern and a wear layer, whereby said print pattern is directly applied to said substrate, and further concerns a method to produce such coverings.

10 Claims, 1 Drawing Sheet

(51) Int. Cl.
*B32B 27/20* (2006.01)
*B32B 27/08* (2006.01)
*B44C 1/24* (2006.01)
*B44C 5/04* (2006.01)
*B32B 27/00* (2006.01)
*E04F 15/02* (2006.01)

(56) References Cited

U.S. PATENT DOCUMENTS

| | | |
|---|---|---|
| 4,180,615 A | 12/1979 | Bettoli |
| 4,333,987 A | 6/1982 | Kwart |
| 4,393,187 A | 7/1983 | Boba |
| 4,507,188 A | 3/1985 | Chu |
| 5,128,196 A | 7/1992 | Luetkens, Jr. |
| 5,221,395 A | 6/1993 | Luetkens, Jr. |
| 5,458,953 A | 10/1995 | Wang |
| 5,462,794 A | 10/1995 | Lindemann |
| 5,728,332 A * | 3/1998 | Frisch ............... B05D 3/107 264/46.4 |
| 6,291,078 B1 | 9/2001 | Chen |
| 6,333,076 B1 * | 12/2001 | Sigel ............... B05D 3/0209 427/487 |
| 8,272,187 B2 | 9/2012 | Meersseman |
| 9,663,951 B2 | 5/2017 | Dohring |
| 2002/0051866 A1 | 5/2002 | Mullen |
| 2002/0160677 A1 | 10/2002 | Loffler |
| 2004/0126571 A1 | 7/2004 | Bordener |
| 2007/0090553 A1 | 4/2007 | Bordener |
| 2009/0139170 A1 * | 6/2009 | Thiers ............... B44F 9/02 52/309.1 |
| 2009/0181180 A1 * | 7/2009 | Poullos ............... B05D 7/586 427/475 |
| 2010/0098963 A1 | 4/2010 | Dohring |
| 2010/0132296 A1 | 6/2010 | Bootier |
| 2011/0241248 A1 | 10/2011 | Merkel |
| 2011/0268937 A1 * | 11/2011 | Schacht ............... B44C 5/0453 428/205 |
| 2012/0015107 A1 * | 1/2012 | Schacht ............... B44C 5/043 427/261 |
| 2013/0084429 A1 | 4/2013 | Mittag |
| 2014/0199531 A1 * | 7/2014 | Pervan ............... E04F 15/02 428/207 |
| 2014/0335273 A1 * | 11/2014 | Haller ............... B05D 5/06 427/256 |
| 2015/0337540 A1 | 11/2015 | Cappelle |

FOREIGN PATENT DOCUMENTS

| | | |
|---|---|---|
| EP | 2759394 A1 | 7/2014 |
| RU | 2007127895 A | 1/2009 |
| WO | 2011046432 A1 | 4/2011 |
| WO | 2012046051 A1 | 4/2012 |
| WO | 2014109702 A1 | 7/2014 |

\* cited by examiner

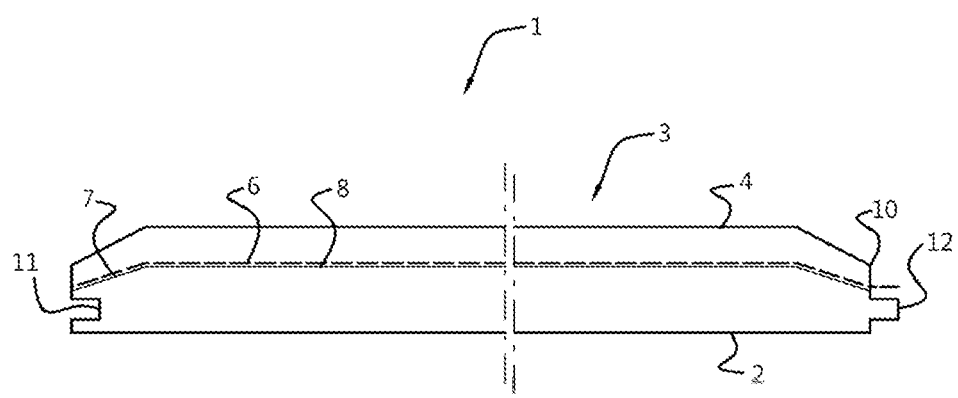

COVERING AND METHOD FOR PRODUCING COVERINGS

This application is a continuation of application Ser. No. 15/543,374 filed Jul. 13, 2017, which claims the benefit of European Application No. 15151552.5 filed Jan. 16, 2015, and PCT/EP2016/050735 filed Jan. 15, 2016, International Publication No. WO 2016/113379 A1, which are hereby incorporated by reference in their entirety as if fully set forth herein.

TECHNICAL FIELD

The invention pertains to the technical field of coverings such as floor coverings, wall coverings or ceiling coverings and to methods to produce such coverings. Preferably, the invention pertains to the technical field of covering panels.

BACKGROUND

Coverings for floor or wall decorations usually comprise a layered structure comprising at least one substrate and at least one surface layer, whereby the surface layer typically comprises a print layer or a print in the form of a pattern, such as for example a wood fibre pattern or brick or stone type pattern. In the case of covering panels, the coverings can optionally be provided with interlocking means to easily connect and fixate two or more covering panels and optionally with a bevel in order to obtain the floor or wall decoration.

Such coverings are known in the art. For example, EP 1 938 963 describes a panel which has a decor film on an upper side of a core of plastic, and a transparent finishing layer on the decor film. A transparent lacquer layer is applied on the finishing layer, and a back-pull layer is provided on the back of the core. A lockable tongue and groove connection is provided at two mutually opposite edges of the panel. The decor film includes a PVC film that is printed with a decor, and the lacquer layer is UV curable. The panel has thickness of 4 to 8 millimeter, and weight per unit area of 1.5 to 2.0 kilogram per square meter per millimeter of thickness.

A problem with the coverings described in the prior art is the complexity of the process to produce the coverings as several different types of layers and curing or other treatment steps need to be applied sequentially in order to obtain the coverings. These various types of sequential steps reduce the flexibility of the different types of decorations that can be obtained and increase the production cost of the coverings.

There remains a need in the art for improved coverings which can be produced in an easy and cost effective manner with a high degree of flexibility with regard to the types of coverings and designs (look and/or feel) that can be produced and which may be easily adapted to the needs and wishes of a client.

The present invention aims to resolve at least some of the problems mentioned above.

The invention thereto aims to provide a covering comprising at least one substrate with a print pattern directly applied to the substrate, allowing a broad variety of coverings with different designs to be produced in an easy and flexible manner. The invention further aims to provide a method to produce such coverings.

SUMMARY OF THE INVENTION

The present invention provides a covering, such as floor coverings, wall coverings or ceiling coverings, as provided by claim 1.

In a further aspect, the present invention provides a method for producing coverings, as provided by claim 9. Preferably, the method according to the invention is suitable to produce a covering according to claim 1.

BRIEF DESCRIPTION OF THE DRAWING

FIG. 1 schematically shows one embodiment of the invention.

DETAILED DESCRIPTION OF THE INVENTION

The present invention concerns coverings such as floor coverings, wall coverings or ceiling coverings which can be produced in a flexible process, allowing a broad of variety coverings with different designs to be produced which may be easily adapted to the needs and wishes of a client.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

The recitation of numerical ranges by endpoints includes all numbers and fractions subsumed within that range, as well as the recited endpoints.

All percentages are to be understood as percentage by weight and are abbreviated as "wt. %", unless otherwise defined or unless a different meaning is obvious to the person skilled in the art from its use and in the context wherein it is used.

The term "polymer" as used herein, also referred herein as "polymeric material", can be any one or more polymers. For instance, a polymer can be a thermoplastic or thermoset polymer. The polymer can be any polymer, including natural products and synthetic products. The polymeric material can be, for example, a thermoplastic polymer, a thermosetting polymer, a rubber (elastomer), or any combinations thereof. Further, the polymer can be, for example, any type of polymer, such as a homopolymer, random polymer, alternating polymer, graft polymer, block polymer, star-like polymer, comblike polymer, crosslinked polymer, and/or vulcanized polymer. The polymer can be one or more polyblends. The polymer can be, for example, a thermoplastic elastomer (TPE), an interpenetrating polymer network (IPN); simultaneous interpenetrating polymer network (SIN); or interpenetrating elastomeric network (IEN). Examples of polymers include, but are not limited to, a silicone-containing polymer, for instance, polydimethyl siloxane, fluorosilicones, silicone-organic polymers, or silicone-organic hybrid polymers, olefin-containing, diene-containing and butene-containing polymers and copolymers. Particular examples include elastomers such as solution styrene-butadiene rubber (SBR), natural rubber, emulsion SBR, polybutadiene, polyisobutadiene, polyisoprene, polychloroprene, NBR, EPDM, EPM, isobutene elastomers, and their functionalized or modified derivatives or blends thereof. Other examples of polymers include, but are not limited to, linear and nonlinear polymers such as polyethylene, poly(vinylchloride), polyisobutylene, polystyrene(s), polycaprolactam (nylon), polyisoprene, and the like. Other general classes of polymers include polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), cellulose acetate, ethylene-vinyl acetate, polyacrylonitrile, fluoropolymers and fluoroplastics, ionomeric polymers, polymers containing ketone group(s), polyketone, liquid crystal polymers, polyamide-imides, polyaryletherketone, polymers containing olefinic double bond(s) (such as polybutadiene, polydicyclopentadiene), polyphenylene oxides, polyurethanes, thermoplastic elastomers, polyolefins (such as polyethylene, 1-butene, polypropylene, 1-hexene, 1-octene, 4-methyl-1-pentene, substituted alpha-olefins, and the like), polyolefin copolymers (such as copolymers of: ethylene, 1-butene, propylene, 1-hexene, 1-octene, 4-methyl-1-pentene and substituted alpha-olefins and the like), polyolefin terpolymers, polycarbonates, silicone polymers, alkyd, epoxy, unsaturated polyester, vinyl ester, urea-, melamine-, or phenol-formaldehyde resins, and the like. Other examples of the polymer can be an acrylic polymer, a methacrylic polymer, or a styrenic polymer or silicone polymer. The polymer can also be a polyolefin.

As used herein, the term "thermoplastic" refers to a polymeric material that becomes pliable or moldable above a specific temperature and substantially solidifies upon cooling. Examples of thermoplastic polymers include, but are not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; styrenes such as ABS, SAN, and polystyrenes and copolymers thereof; polypropylene and copolymers thereof; saturated and unsaturated polyesters; acrylics; polyamides such as nylon containing types; engineering plastics such as acetyl, polycarbonate, polyimide, polysulfone, and polyphenylene oxide and sulfide resins and the like. The thermoplastic material can be in powder, liquid, cubed, pelletized form and/or any other extrudable form. Also, the thermoplastic polymer can be virgin, recycled, or a mixture of both.

With the term "filler" as used herein, a component is meant that can improve the properties of a composition by, for example, improving its texture or structure, by providing dimensional stability and reduced elasticity, by providing properties of fire resistance and/or by reducing the overall cost of the composition. Examples of fillers include, but are not limited to, calcium carbonate, talc, chalk, limestone, marble, barium sulphate, aluminium trihydroxide, kaoline, silica, alumina, magnesium hydroxide, clay or any combination of the previous. The filler can be recycled from any source and may be in any physical form that allows it to be mixed or blended with the other ingredients of a composition. Typically, the filler is added in the form of particles. Preferably, the filler comprises talc, chalk or a combination of chalk and talc.

As used herein, a "stabilizer" refers to a compound that can provide heat stability and/or UV light stability to a polymer, preferably a polyvinyl chloride polymer. The stabilizer according to the present invention can be selected for effectiveness with the particular polymer used. Examples of stabilizers include, but are not limited to, calcium-zinc stabilizer barium-cadmium stabilizers, barium-zinc stabilizers, organotin stabilizers, epoxidized soybean oils, and the like.

The term "plasticizer" as referred herein is to be understood as a compound used to increase the fluidity or plasticity of a material, typically a polymer. The plasticizer can be any plasticizer known in the art. For example, the plasticizer may be a phthalic diester, such as diisononyl phthalate (DINP). Other examples of plasticizer include, but are not limited to ditridecylphthalate, diisodecyl phthalate, dipropylheptyl phthalate, diisooctyl terephthalate (DOTP), benzoates, adipates, any o-phthalate free plasticizers, natural-material based plasticizers, and the like.

As used herein, an "adhesive" may be a compound such as a chemical adhesive which, for example can be a one-part or multiple part adhesive such as a two-component polyurethane liquid adhesive, for example a polyurethane or an epoxy; a film such as double sided tape or pressure sensitive adhesive (PSA); or another layer or film comprising a material which is compatible with (i.e., bonds to) both a first layer and a second layer, for example in a substrate. Examples include polyolefin copolymers such as ethylene/vinyl acetate, ethylene/acrylic acid, ethylene/n-butyl acrylate, ethylene ionomers, ethylene/methylacrylate, and ethylene or propylene graft anhydrides. Other useful adhesives include urethanes, copolyesters and copolyamides, styrene block copolymers such as styrene/butadiene and styrene/isoprene polymers, acrylic polymers, and the like. The adhesives may be thermoplastic or curable thermoset polymers, and can include tacky, pressure-sensitive adhesives. Further suitable adhesives are foam craft adhesives such as 3M Styrofoam Spray Adhesive, adhesives based on dispersions, e.g. ACRONAL™ Acrylate Dispersions available from BASF, one-component polyurethane adhesive such as INSTASTIK™ available from The Dow Chemical Company, hot-melt adhesives, moisture-cured adhesives such as those described in U.S. Pat. No. 7,217,459B2, which is hereby incorporated by reference, single- or preferably two-component adhesives based on polyurethane resins or on epoxy resins, see USP 20080038516A1, which is hereby incorporated by reference, and the like.

A "colorant" as used herein, refers to a component that is added or applied to, for example, a substrate or a material, to cause a change in colour. Colorants can be dyes, pigments, inks, paints, etc. A "dye" is a coloured substance that typically has an affinity for the substrate or material to which it is being applied. The dye is typically applied in a solution (e.g. water-based, organic solvent-based, or oil-based) and usually requires a mordant to improve the fastness of the dye on, for example, a substrate, i.e. in order to fixate the dye to the substrate. Colorants such as dyes and pigments appear to be coloured because they absorb some wavelengths of light more than others. In contrast to a dye, a "pigment" generally is insoluble, and typically is applied as a powder or as a liquid dispersion (e.g. water-based, organic solvent-based, or oil-based). The colorant may be in the form of a masterbatch or in the form of plastics or recycled plastics which comprise a desired colour.

The term "wear resistant agent" as used herein refers to a compound that is added to, for example, a surface or layer to improve the wear resistance of that surface or layer. Typically, the wear resistant agent comprises hard particles such as aluminium oxide and/or other hard particles, such as metal oxides or ceramics which are typically incorporated onto a surface or into a layer. Preferably, the wear resistant agent comprises aluminium oxide. A sufficient amount of the aluminium oxide and/or other wear resistant agents may be present in at least one layer of the covering to provide improved wear and/or stain resistance to a covering as compared to no aluminium oxide being present. The aluminium oxide used in the present invention is also known as alumina or $Al_2O_3$. The refractive index can be from about 1.4 to about 1.7. From about 2 gsm to about 50 gsm, or from about 4 gsm to about 20 gsm of alumina, for example, can be present as wear resistant agent in at least one layer of the covering. Alternatively, from about 1% by weight to about 40% by weight of alumina can be present as wear resistant agent in at least one layer of the covering. Also, while any source of aluminium oxide can be used, the aluminium oxide can have the following characteristics: fused or calcined and having a hardness of from about 6 to about 9 on a Mohs' scale, and most preferably about 9 on a Mohs' scale. The particle size of the aluminium oxide can be, for example, from about 0.1 microns to about 70 microns, or from about 0.5 microns to about to about 60 microns, or from about 1 microns to about 50 microns, or from about 10 to about 40 microns. Sources of aluminium oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc., Birmingham, Ala. The aluminium oxide, which can be part of at least one layer of the covering as wear resistant agent, can be added in any manner known to those skilled in the art for adding particles to a layer. The aluminium oxide can be, for example, applied by a pellet dispenser, which applies or sprinkles aluminium oxide on top of a layer which is still "wet" or uncured. By the layer being "wet" or uncured, the aluminium oxide "sticks" or adheres to the "wet" layer and at least a portion of the aluminium oxide "sinks" into the layer and thus is not exposed to the environment. Instead of alumina, other metal oxides or ceramics can be used. The mixing of alumina (and/or other hard particles) with a formulation that forms the wet layer generally requires constant mixing of the layer with alumina to preferably keep the alumina suspended in the layer. Surface treatments of the alumina and the use of other anti-settling agents may hereby help in minimizing the settling. Once the aluminium oxide is applied to the layer which is "wet" or uncured, the covering containing this layer is typically cured by means known to those skilled in the art, such as radiation curing, UV, electron beam, thermal and/or moisture curing, and the like. The aluminium oxide can be present in the outermost layer of a covering, for example an additional top wear layer or wear layer, which is the layer subjected to the environment including foot traffic and other objects coming in contact with the covering.

The term "intaglio printing" refers to a printing technique that uses a printing device, i.e. ink transferring device, in which recesses have been applied in a desired pattern, which recesses can contain ink. When the printing device is placed on, for example, a substrate, the ink in the recesses is transferred onto the substrate, typically creating a print pattern on the substrate which is the mirror image of the pattern of the recesses. Preferably, the intaglio printing as referred to in the current invention uses a metal cylinder as printing device, such as a copper or aluminium cylinder. The outer curved surface of the cylinder is hereby typically provided with recesses in a desired pattern, after which the outer surface is impregnated with ink. Typically, a squeegee is used to remove any excess ink from the outer surface so that the ink is only retained in the recesses. To apply the ink to the substrate, the cylinder is typically rolled over de substrate to provide it with a desired print.

The term "screen printing" is a term known in the art and refers to a printing technique that typically uses a screen made of a woven mesh onto which an ink blocking stencil is applied. The stencil typically has openings through which the ink can penetrate the screen and be transferred onto, for example, a substrate underneath the screen. A fill blade or squeegee is typically moved across the screen stencil, forcing or pumping ink through the mesh openings to wet the substrate during the squeegee stroke. It should be noted that the application of a print pattern to a substrate using screen printing is not limited to the use of a woven mesh with a stencil as described above, and other screens, stencils or screen printing techniques known in the art can be used to apply a print pattern to a substrate. For example, EP 2 448 758 describes a non-limiting example of a screen printing device that can be used in the current invention, which is hereby incorporated as a reference.

"Digital printing" refers to methods of printing from a digital-based image directly to a variety of substrates. Examples of digital printing techniques include inkjet printing and laser printing.

"Inkjet printing" is a digital printing technique known in the art that recreates a digital image by propelling droplets of a colorant, for example, an ink onto a substrate. Typically printheads using e.g. piezoelectric crystals are used to deposit the droplets on the substrate. Generally, there are two main technologies in use in contemporary inkjet printing processes: continuous (CIJ) and Drop-on-demand (DOD).

With the term "laser printing" as used herein, a digital printing technique is meant known in art and refers to an electrostatic digital printing technique that typically allows to very rapidly produce high-quality prints by repeatedly passing a laser beam back and forth over an electron-charged, cylindrical drum, to define a differentially-charged image. Typically, the drum then selectively collects an electrically-charged, powdered colorant (i.e., toner), and transfers the image to a loaded substrate, which is then heated in order to permanently fuse the text/imagery to the substrate.

The term "fibreboard" refers to a product, such as a panel or a substrate, that comprises wood fibres. A fibreboard is typically produced by defibration or steam explosion of wood chips to obtain wood fibres, forming a mat of the fibres, and pressing the mat while applying heat and pressure. Conventionally, the mat is prepared either by a dry process from wood fibres with a water content below about 120% (by weight of the dry fibres) with addition of adhesives, or by a wet process from an aqueous slurry of wood fibres with a water content of about 200-10000% (by weight of the dry fibres). In the wet process, it is conventional to add a binder (adhesive) to the aqueous fibre slurry and/or to cure the fibreboard at high temperature after the pressing, in order to improve the mechanical properties of the fibreboard. Depending on the amount of pressure used during the production process and the type and configuration of wood fibres used, three types of fibreboards can be identified: particle board (or low-density fibreboard), medium-density fibreboard and hardboard.

The term "foamed" or "foam" indicates that the referent following the term, such as for example a compound, material, layer, etc., comprises one or more foaming agents, also termed blowing agents. With the term "foaming agent" or "blowing agent", as used herein as synonyms, a compound is meant which is capable of forming a cellular structure in a wide variety of materials, typically under the influence of heat, via a foaming process. Such cellular structure typically lowers the density of the material and typically results in an expansion in volume of the material. The blowing agent in the foamed plastic-based material may include at least one selected from a chemical blowing agent, a physical blowing agent, or a mixture thereof. Physical blowing agents are typically added to the material in a liquid phase, after which the temperature is raised, thereby transforming the blowing agent into its gaseous phase, and hence resulting in the formation of a cellular structure and the expansion of the material, though they may also be directly added to the material in their gaseous phase. Chemical blowing agents will undergo a chemical reaction under the influence of heat, thereby forming gaseous products that will form the cellular structure. As the chemical blowing agent, any compound may be used as long as the compound may be decomposed at a specific temperature to generate gas, and an example thereof may include azodicarbonamide, azodi-isobutyro-nitrile, benzenesulfonhydrazide, 4,4-oxybenzene sulfonyl-semicarbazide, p-toluene sulfonyl semicarbazide, barium azodicarboxylate, N,N'-dimethyl-N,N'-dinitrosoterephthalamide, trihydrazino triazine, sodium bicarbonate, potassium bicarbonate, ammonium bicarbonate, sodium carbonate, ammonium carbonate, as well as any derivative of the previous or any combination of the previous. Further, examples of a physical blowing agent may include an inorganic blowing agent such as carbon dioxide, nitrogen, oxygen, argon, water, air, helium, or the like, or an organic blowing agent such as aliphatic hydrocarbons containing 1 to 9 carbon atoms, including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); fully and partially halogenated polymers and copolymers, desirably fluorinated polymers and copolymers, even more preferably chlorine-free fluorinated polymers and copolymers; aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether and carboxylate compounds such as methyl formate, methyl acetate, ethyl acetate and carboxylic acid, or any combination of the previous. The amount of blowing agent can be determined by one of ordinary skill in the art without undue experimentation for a given material to be foamed based on the type of material, type of blowing agent, the shape/configuration of the to be foamed material, and the desired foam density. The foam density, typically, is selected depending on the particular application. Preferably, the foam density is equal to or less than about 1600 $kg/m^3$, more preferably less than about 1400 $kg/m^3$, even more preferably less than about 1300 $kg/m^3$, and most preferably less than about 1200 $kg/m^3$. A foam density of less than about 1150 $kg/m^3$ is especially preferred. Preferably the foam density is equal to or more than about 400 $kg/m^3$, more preferably more than about 600 $kg/m^3$, even more preferably more than about 800 $kg/m^3$, and most preferably more than about 1000 $kg/m^3$. A foam density of more than about 1050 $kg/m^3$ is especially preferred. A foam density of about 1100 $kg/m^3$ is especially preferred. Obviously, any density comprised between the aforementioned densities are deemed suitable with respect to the density of the substrate. The cells of a foamed material may have an average size (largest dimension) of from about 0.05 to about 5.0 millimeter (mm), especially from about 0.1 to about 3.0 mm, as measured by ASTM D-3576-98.

The definition of the phrase "laminate" as used in the present invention should be understood in the wider sense of the word, implying that a laminate constitutes two or more layers of materials.

In a first aspect, the invention provides a covering, such as a floor covering, wall covering or ceiling covering, said covering comprising:
  at least one substrate;
  at least one surface layer, said surface layer comprising a print pattern and a wear layer;
whereby said print pattern is directly applied to said substrate.

The covering of the present invention can be any covering, such as a floor covering, wall covering, ceiling, and the like and can have any shape or form known in the art. The covering can be used essentially in any room in a house or work environment, including the kitchen, bathroom, living room, dining room, recreation room, garage, and outside living spaces, such as a porch, deck, shed, terrace, summerhouse, and the like. The coverings of the present invention can be used in an inside or outside environment. The covering can be water resistant and preferably does not swell when wet. For example, the swelling of certain embodiments of the coverings of the present invention may be negligent (e.g., zero or zero to less than 0.01 mm or 0.0001 mm to less than 0.001 mm) when tested at LF 3.2 of NALFA LF 01-2003. Further, the coverings can be resistant to various chemicals and detergents and, therefore, can optionally be used in industrial, recreational, or garage environments.

The covering according to the invention can be provided in any shape, such as a rounded shape and a polygonal shape. Preferably, the covering is provided in the shape of a triangle, rectangle, square, pentagon, hexagon, heptagon or octagon. In one embodiment, the covering has a three-dimensional shape. In one preferred embodiment, the covering can be formed as a rectangle with two pairs of opposing sides wherein the pairs of sides can be the same or different in length relative to each other. In one example, the covering is rectangular. The rectangular covering can have opposite shorter sides having a width, for example, of from about 10 cm to about 50 cm, preferably from about 10 cm to about 30 cm or other widths, and opposite longer sides having a length, for example, of from about 50 cm to about 300 cm, preferably from about 80 cm to about 250 cm or other lengths. In one example, the covering also may be square shaped. The sizes of the present coverings are not necessarily limited with respect to larger sizes other than possibly by practical considerations such as respect to handling, etc. In some examples, the coverings have square shapes with a side length of from about 20 cm to about 100 cm, preferably from about 25 cm to about 80 cm, more preferably from about 30 cm to about 60 cm, or other side lengths.

Preferably, the covering is a covering panel. As used herein, a "covering panel" or "panel" refers to a covering comprising a component, material or layer which renders rigidity to the covering.

A covering whereby a print pattern is directly applied to a substrate as described herein significantly simplifies the production process to produce the covering as it no longer requires the necessity of applying additional pre-coatings to the substrate, and allowing the coverings to be produced in a much more flexible manner compared to prior art coverings. Hence, as the complexity of the production line is reduced, the covering that can be produced may be more readily adapted to the needs and preferences of a client.

A substrate according to current invention preferably comprises a core with a top surface and bottom surface as well as side surfaces. The surface layer can be applied on the top surface, the bottom surface and/or side surfaces of the substrate. Preferably, the surface layer is applied on at least the top surface of the substrate. If the surface layer is not applied to the bottom surface of the substrate, optionally, one or more other layers may be applied to the bottom surface, which one or more other layers are often referred to as "backing layers". Such backing layers are known in the art and may comprise any type of material or configuration known in the art. Similarly, when no surface layer is applied to the side surfaces of the substrate, optionally, one or more other layers may be provided on these side surfaces (such as e.g. on a bevel).

The substrate can be flexible, rigid or semi-rigid. In one embodiment, the at least one substrate comprises a material selected from a wood-based material, a polymer-based material, a foamed polymer-based material or any combination of the previous. Examples of a wood-based material include for example wooden panels, e.g. oak, pine, etc. panels, or processed wood materials, such as a fibreboard, including a particle board (or low-density fibreboard), medium-density fibreboard or hardboard. A polymer-based material includes any thermoplastic polymer, thermoset polymer, or blend of polymers. The substrate may also comprise composite materials such as wood particle composites, referring to a composite structure comprising a wood-based material and a polymer-based material, which optionally may be foamed.

In one embodiment, the substrate is comprised of one or more layers comprising a polymeric material. The polymeric material can be, for example, a thermoplastic polymer, a thermoset polymer, or blends of polymers. In another example, the substrate comprises a laminate structure of diverse material layers (e.g., two or three or more layers that can be the same or different with respect to composition and/or physical properties) including one or more layers comprising a polymeric material.

The substrate or at least one layer of the substrate may include one or more additives known in the art such as fillers, plasticizer or stabilizers. Preferably, the substrate comprises a filler, preferably whereby said filler comprises talc, chalk or a combination of both. In another embodiment, the substrate comprises a filler and optionally other additives similar as described in the co-pending European patent application No EP15151551.7 entitled 'Covering panel and process of producing covering panels' filed by the Applicant on 16 Jan. 2015. Other ingredients can be present in the substrate or in at least one layer, such as flame retardants, antistatic agents, wear resistant agents, antimicrobial additives, processing aids, dispersion additives, lubricants, colorants, modifying resins, cross-linking agents, antioxidants, foaming agents, tackifiers, and/or other conventional organic or inorganic additives commonly used in substrates for coverings.

The substrate may further include adhesives, for example when the substrate comprises a laminated structure with two or more layers adhered to one another. Any adhesive capable of bonding a specific layer to another layer is within the scope of the present invention. An effective type and amount of adhesive can be determined by one of ordinary skill in the art without undue experimentation for a given layer/layer combination.

Alternatively, mechanical means may be used to bond two or more layers of the substrate. For example, fasteners, snap fits, clips, mounting points, joints, channels, Velcro, and the like may be used. Alternatively, thermal means may be used to bond or weld together two layers, e.g., from heating and/or sonic (vibration) means. Alternatively, physical means or chemical means may be used to bond or weld together two layers. Alternatively, one or more of thermal means, mechanical means, physical means, chemical means, and/or adhesive means, may be used in combination to bond a first layer to a second layer. To promote adhesion or bonding between two layers, one or both of the surfaces to be bonded may optionally be planed, grooved, scored, roughened, sanded, etc.

In one embodiment, the substrate comprises a wood-based material, preferably onto which wood-based material a print pattern is directly applied. Examples of a wood-based material include, for example, essentially unprocessed wood materials, such as wood panels, e.g. oak, pine, etc. panels, or processed wood materials, such as fibreboards, including a particle board (or low-density fibreboard), medium-density fibreboard or hardboard. When applying a print pattern directly on a substrate comprising an essentially unprocessed wood material, additional advantageous effects can be obtained. For example, when using a less expensive wood material in the substrate, the print pattern applied to the substrate can give the wood material the appearance of a more expensive wood material, allowing coverings to be produced that appear to comprise expensive wood material, but which can be produced in a more cost effective manner. Further, the nerve structure of the wood-based material can be improved, enhanced or highlighted with a print pattern adapted to the needs and desires of a customer, thereby allowing a broad variety of different covering types to be obtained.

In one embodiment, the substrate comprises at least one extruded thermoplastic material comprising one or more colorants, preferably onto which thermoplastic material the print pattern is directly applied. In a preferred embodiment, the thermoplastic material comprises a polyvinyl chloride-based material. A polyvinyl chloride based material is preferably used as it provides several advantages such as for example its easy processability in an extrusion process, and its good (sound and heat) isolating properties, while being cheap, making it a desired material to use in covering applications. The substrate may in addition to at least one extruded thermoplastic material optionally comprise other components, such as, but not limited to, wood fibres or wood particles, fillers, plasticizer, stabilizers, flame retardants, antistatic agents, wear resistant agents, antimicrobial additives, pigments, processing aids, dispersion additives, lubricants, modifying resins, cross-linking agents, antioxidants, foaming agents, tackifiers, etc. The one or more colorants may be distributed throughout the thermoplastic material in any kind of manner, such as for example in a uniform manner, in order to obtain a substrate provided with a uniform colour, or in a non-uniform manner to, for example, yield a variegated pattern. To yield a variegated pattern, different colorants with a slightly different melting point may be added to the thermoplastic material, for example before extrusion, to create different spots, shadings, patterns, etc. throughout the substrate. In one example, the colorant can be added by means of colorant beads which upon processing (e.g. extrusion) burst and spread the colorant as the thermoplastic material is being processed. It should be readily appreciated that different colorants may be distributed throughout the thermoplastic material in a uniform or non-uniform manner, or a combination of both to yield a desired substrate. Preferably, at least one colorant is distributed non-uniformly throughout said substrate to yield a variegated pattern, such as for example to obtain a substrate that substantially has the appearance of a wood-like material. By providing the substrate with a certain kind of colour and/or with a certain kind of coloured pattern on the surface and throughout its structure, the thermoplastic material can already substantially be given the appearance or the base colour of a desired print pattern of the final covering material, such as for example a wood-like material, or the thermoplastic material may so influence the appearance of the print pattern applied on the substrate. This way, less additional steps or additional materials such as extra layers or coatings, need to be applied to the substrate in order for it to obtain the desired "look" or appearance. Moreover, this allows to create more natural-like (e.g. wood) patterns with no repetition of the design, which is a problem with present surface coverings.

In one example, the substrate comprises two or more thermoplastic materials which are co-extruded, of which at least one of the thermoplastic materials comprises one or more colorants (as described in the foregoing paragraph). Preferably the thermoplastic material/materials which is/are present at the outer surface of the substrate (i.e. the external surface of the substrate onto which a surface layer can be applied, such as the top surface, bottom surface, side surfaces or optionally any bevel or locking system that may be provided in the substrate) will hereby comprise one or more colorants to provide the substrate with a desired appearance or base colour of a desired print pattern of the final covering material. This way, less colorants need to be added to the substrate, as only the outer materials are provided therewith, thus reducing the overall cost to produce the substrate. Furthermore, the thermoplastic material/materials which is/are present at the outer surface of the substrate may also be provided with additional advantageous properties, such as for example an improved sound absorption, resulting in a covering which will provide better acoustics in the room or environment in which it is provided. Finally, the presence of colorants in the thermoplastic material/materials which is/are present at the outer surface of the substrate may also result in a tuning of the wetting properties, of the substrate, particularly the interfacial forces and surface of the substrate, allowing the print pattern and/or the wear layer to more readily adhere to the substrate when it is applied thereon. Preferably, the thickness of the thermoplastic material present at the outer surface of the substrate ranges between about 0.1 and about 10 mm, more preferably between about 0.1 and about 8 mm, even more preferably between about 0.2 and about 6 mm, even more preferably between about 0.3 and about 4 mm, even more preferably between about 0.4 and about 3 mm, most preferably between about 0.5 and about 2 mm.

It should be noted that any of the previous examples or embodiments for the substrate or later described herein may be combined in order to obtain a substrate for a covering according to the current invention.

The wear layer can be made of any suitable material known in the art, such as for example a polymeric film or overlay paper. In one embodiment, the wear layer is comprised of one or more layers comprising a polymeric material. In another example, the wear layer comprises a laminate structure of diverse material layers including one or more layers (e.g., two or three or more layers that can be the same or different with respect to composition and/or physical properties) comprising a polymeric material. The wear layer can comprise, for example, a transparent polyvinyl chloride layer. Other examples of the wear layer include, but are not limited to, acrylic polymers, polyolefins, and the like. The wear layer can be a plasticized or a polyvinyl chloride composition and/or other polymers, such as clear polymers. The wear layer can be a thermoset layer or a thermoplastic layer. Examples of such wear layers can be found in, for example, U.S. Pat. No. 4,333,987 to Kwart et al., U.S. Pat. No. 4,180,615 to Bettoli, U.S. Pat. No. 4,393,187 to Boba et al., and U.S. Pat. No. 4,507,188 to Chu. The wear layer top coat can be a hard, thermoset, radiation-curable acrylate monomers and/or oligomers having a glass transition temperature (Tg) of greater than about 50° C.

The wear layer can further be, for example, a water based, solvent based, radiation-curable, non-radiation curable, UV-curable or non-UV curable system. For example, the wear layer top coat can be comprised of acrylics, acrylates, urethanes, epoxides, other type vinyls, other type polymers, and blends thereof.

In one example, the wear layer is an acrylated urethane based UV-curable layer. Optionally, on the wet (not cured) wear layer, about 5-15 gsm of fused alumina with average particle size in the range of about 25-40 microns can be applied to this layer by a modified Christy Machine or by a Schilling scattering machine and then the layer can be cured by UV-light (or other radiation curable source) employing either a direct or differential cure mechanism. Depending on the product specification, the amount of alumina and the thickness of the layer can be varied. Carborundum, quartz, silica (sand), glass, glass beads, glass spheres (hollow and/or filled), plastic grits, silicon carbide, diamond dust (glass), hard plastics, reinforced polymers and organics, etc., may be substituted for all or part of the alumina. The techniques and formulations described in U.S. Pat. No. 6,291,078 can be used herein and this patent is incorporated in its entirety by reference. Preferably, the acrylated urethane based UV-curable layer comprises one or more colorants, which may be distributed throughout said acrylated urethane based UV-curable layer in any kind of manner, such as for example in a uniform manner, in order to obtain a layer provided with a uniform colour, or in a non-uniform manner to, for example, yield a variegated pattern. It should be readily appreciated that different colorants may be distributed throughout the acrylated urethane based UV-curable layer in a uniform or non-uniform manner, or a combination of both to yield a desired wear layer. This way, the visual appearance of the wear layer can be tuned and adapted according to the desired covering by simply adding one or more colorants to the wear layer.

The wear layer may optionally further comprise other components, such as wood fibres or wood particles, fillers, plasticizer or stabilizers, flame retardants, antistatic agents, wear resistant agents, antimicrobial additives, processing aids, dispersion additives, lubricants, modifying resins, cross-linking agents, antioxidants, foaming agents, tackifiers, etc. In one embodiment, the wear layer comprises one or more colorants. In yet another preferred embodiment, the wear layer comprises at least one extruded thermoplastic material comprising one or more colorants. The one or more colorants may be distributed throughout said wear layer in any kind of manner, such as for example in a uniform manner, in order to obtain a wear layer provided with a uniform colour, or in a non-uniform manner to, for example, yield a variegated pattern as explained hereinbefore. Preferably, at least one colorant is distributed non-uniformly throughout said wear layer to yield a variegated pattern, such as for example to obtain a wear layer that substantially has the appearance of a natural (e.g. wood)-like material. By providing the wear layer with a certain kind of colour and/or with a certain kind of coloured pattern on its surface and throughout its structure, the wear layer can already substantially be given the appearance of a desired print pattern of the final design.

In one embodiment, the wear layer comprises two or more thermoplastic materials which may be co-extruded, preferably of which at least one of the thermoplastic materials comprises one or more colorants.

It should be noted here that though reference is made to a wear "layer", this does not necessarily imply that it should be provided on the entire surface of the substrate or the print pattern. A wear layer hereby also encompasses configurations whereby it is only applied on selected or discontinuous areas of the substrate or of the print pattern. Further, it should be noted that any of the previous examples or embodiments for the wear layer or later described herein may be combined in order to obtain a wear layer for a covering according to the current invention.

In one embodiment, both the substrate and the wear layer comprise at least one extruded thermoplastic material comprising one or more colorants, using similar embodiments, configuration, materials, etc. as described above for the substrate and wear layer separately. By "tuning" the appearance of both the substrate and the wear layer using colorants, a large amount of different covering configurations with different colour patterns can be obtained.

Optionally, one or more additional layers can be present in addition to the surface layer, such as the layers described in U.S. Pat. No. 5,458,953, incorporated in its entirety by reference herein. Such additional layers include strengthening layers, additional foamable layers, and one or more wear layer base coat(s). The composition of these layers is described in U.S. Pat. No. 5,458,953 and can be used in the covering of the present invention. In one embodiment, at least one additional top wear layer is provided on the surface layer. Such additional top wear layer may comprise similar configurations, materials, etc. as described above for the wear layer. In a preferred embodiment, the additional top wear layer comprises a transparent polyvinyl chloride layer or a transparent urethane based UV-curable coating. The additional top wear layer can have several advantages such as an increased wear resistance against scratching, by allowing the covering to be more easily cleansed and/or by making the covering more mat. In one embodiment, at least one additional print pattern is provided to the surface layer, which may have the same or a different pattern as the print pattern comprised in the surface layer. In one embodiment, at least one additional print pattern and at least one additional top wear layer is provided to the surface layer, which may be provided to the surface layer in any type of order, e.g. first an additional print layer, then an additional top wear layer or vice versa, etc. Preferably, the last layer applied is an additional top wear layer.

In one embodiment according to the present invention, one or more layers of the covering can contain wear resistant agents, such as the substrate, wear layer, print pattern, surface layer and/or optionally the additional top wear layer(s) and/or additional print pattern(s). Preferably, at least one layer of the covering, i.e. the substrate, wear layer, print pattern, surface layer or optionally the additional top wear layer or additional print pattern, comprises a wear resistant agent.

In a preferred embodiment, the covering comprises a wear resistance conform the European standards EN 13329, EN 660-2 or EN 16511, making it robust enough to substantially withstand damage caused by external contact such as foot traffic and other objects coming in contact with the covering, i.e. scratching, etc., especially when the covering is intended to be used as a floor covering.

In case the covering is a covering panel, the covering according to the present invention may further comprise coupling parts, i.e. a locking system, for assembling several covering panels together. Coupling mechanisms have been widely used for many years and are well known to the artisan. Most popular coupling parts are glueless locking systems where both horizontal and vertical locking of the panels are realized with a tongue along one (edge) side and a groove along the opposite (edge) side of the panel. Typically tongue and groove locking systems are integrally made with the panel. An alternative locking system comprises a plurality of staggered hooking tongues, extending outwardly from the edges of the panel. Such a system is for example described in European patent application number 14164155.5, assigned to BerryAlloc NV.

Further, the covering may be provided with at least one bevel. Such bevel is known in the art and may be provided to the covering panel using any method known in the art. In a preferred embodiment, the covering comprises any of a bevel or a locking system. The bevel or the locking system can have any type of configuration known in the art, for example as described above. The bevel and/or locking system can be unitary with the substrate. In other words, the locking system and/or bevel can be part of the overall substrate and can be formed by, for example, cutting out the desired shapes of the bevel and/or locking system, or they can be extruded together with the substrate The bevel and/or locking system are preferably provided on the edges and/or side surfaces of the covering/substrate and this can be done before or after the covering is formed. Preferably, the bevel and/or locking system is provided by milling, such as by using shaper tools. Milling equipment that can be adapted for forming the bevel and/or locking system of the coverings, include profiling machines (double end tenoners) of Homag AG. The starting covering or substrate can have a shape that can be slightly oversized to help accommodate the edge milling operations. It is also possible that the locking system and/or bevel of the substrate can be formed in a mold. Molding of a substrate can be done, for example, by extrusion or injection molding, so that no milling is necessary. For example, U.S. Patent Application Publication No. 2007/0022694 relates in part to a method of forming edge profiles in coverings with extrusion and use of a die, which can be adapted for use herein in this respect and is incorporated in its entirety by reference herein. As an option, the locking system can be separately attached (adhesively, mechanically, or both) components to the side surfaces of the covering or to another part of the covering to provide the locking system to the covering/substrate.

In one example, the bevel and/or locking system are provided to the substrate prior to applying the surface layer, including the print pattern and the wear layer, to the substrate. In a preferred embodiment, the print pattern is extended onto the bevel and/or the locking system. The print pattern may be extended on any part of the bevel and/or the locking system. By extending the print pattern onto the locking system and/or the bevel, these elements are provided with a similar pattern as provided on the surface layer of the covering, allowing the locking system and/or bevel to blend with the print pattern in the surface layer and allowing a more uniform appearance of the covering.

In another embodiment, the bevel is created in the surface layer.

FIG. 1 shows a covering panel 1, a substrate 2, a surface layer 3 comprising a wear layer 4 and a print pattern 6 which is applied directly on the substrate 2. The panel 1 has a beveled edge 7 and the print pattern 6 extends over the outer surface 8 of the substrate 2, onto the beveled edge 7. The print pattern 6 extends onto the locking system 10 having a tongue 11 and groove 12.

As was already described above, the substrate preferably has a core with a top surface and bottom surface as well as side surfaces, whereby the surface layer is preferably at least provided on the top surface of the substrate, as this is the surface onto which is walked on or which is looked at when the covering is provided on the floor, wall or ceiling. In a preferred embodiment, a print pattern is extended to any of the bottom surface and/or side surfaces (some of the side surfaces optionally comprising bevel and/or locking system) of the substrate so that these surfaces blend with the print pattern in the surface layer, which allows a more uniform appearance of the covering. In a most preferred embodiment, the print pattern is extended onto the entire outer surface of the substrate.

In a preferred embodiment, the covering panel is provided with an embossing pattern. Such embossing pattern provides the covering with a three-dimensional structure and improves the overall appearance and feel of the covering. Preferably, the embossing pattern is in register with the print pattern, so as to accentuate the appearance of the print pattern.

In a second aspect, the invention provides a method for producing coverings, such as a floor covering, wall covering or ceiling covering, which method comprises the steps of:
providing a substrate;
applying to said substrate a surface layer, said surface layer comprising a print pattern and a wear layer;
whereby said print pattern is directly applied to said substrate.

The substrate and wear layer may be comprised of any type of material as described above and be provided in any type of configuration or embodiment as described above.

The substrate can be formed using a variety of methods. For instance, the substrate or, optionally, at least one of the layers of which the substrate is comprised, can be formed individually by, for example, calendar rolling, extrusion or other techniques. When the substrate comprises more than one layer, the layers that constitute the entire substrate or a part thereof can be placed on top of each other in a stack in their correct order and be attached to each other using any conventional technique such as, for example, using adhesives or by subjecting them to hot pressing using for example a hydraulic press to form the substrate.

Preferably, the substrate is produced by extrusion of at least one thermoplastic material comprising one or more colorants (as described above), after which a print pattern is directly applied on the substrate. Said thermoplastic material can comprise any type of thermoplastic material as described above. In a preferred embodiment, the thermoplastic material comprises a polyvinyl chloride-based material. During the extrusion, other components may be added to the at least one extruded thermoplastic material, such as, but not limited to, wood fibres or wood particles, fillers, plasticizer, stabilizers, flame retardants, antistatic agents, wear resistant agents, antimicrobial additives, processing aids, dispersion additives, lubricants, modifying resins, cross-linking agents, antioxidants, foaming agents, tackifiers, etc.

In one example, the substrate is produced by co-extrusion of two or more thermoplastic materials, of which at least one of the thermoplastic materials comprises one or more colorants.

In the method according to the current invention, a print pattern is directly applied on the substrate. In a preferred embodiment, the print pattern is applied on the substrate using at least one colorant. Preferably, the substrate is provided with between about 0.1 and about 50 mL of ink per $m^2$ substrate, more preferably between about 0.5 and about 40 mL of ink per $m^2$ substrate, even more preferably between about 1 and about 30 mL of ink per $m^2$ substrate, even more preferably between about 2 and about 20 mL of ink per $m^2$ substrate, most preferably between about 3 and about 10 mL of ink per $m^2$ substrate.

In a preferred embodiment, the colorant is comprised in the form of a UV ink. In this embodiment, after applying the UV ink to the substrate, the ink is preferably at least partially cured by UV light. The penetration of a colorant in the substrate needs to be low, otherwise the colour brightness of the print pattern drops and the sharpness of the print is reduced. Generally, the spreading of ink or a colorant is defined by the interplay between the surface tension and the viscosity of the ink (or colorant) and the substrate, together with the drying/curing time needed to fixate the ink or colorant. Using UV inks, a fast fixation of the colorant can be obtained as right after impact of the UV ink on the substrate, the ink is preferably at least partially cured by UV light, preventing further spreading of the ink and allowing a good adherence to the substrate. This way, a sharp and high quality print pattern can be obtained on the substrate that is properly adhered to it.

In one embodiment, the print pattern is applied on the substrate using one or more wear resistant agents. Preferably, the wear resistant agent comprises aluminium oxide. By providing the print pattern with these wear resistant agents, the print pattern is more resilient against external damage such as foot traffic and other objects coming in contact with the covering. Preferably, the print pattern is applied on the substrate using a combination of one or more wear resistant agents and at least one colorant. Preferably, the colorant comprises a UV ink. The combination of one or more wear resistant agents and at least one colorant allows to obtain a print pattern on the substrate in one single step with a desired pattern and with a sufficient wear resistance, omitting the need to apply any additional wear resistant layer on top of the print pattern. In other words, the print pattern comprises both a decorative function and a wear layer function. In this embodiment, the wear layer of the surface layer comprises partially or entirely the print pattern.

The print pattern may be directly applied on the substrate using any technique known in the art. Preferably, the print pattern is applied to the substrate by laser printing, inkjet printing, intaglio printing, screen printing or any combination of the previous.

Preferably, the print pattern is applied using a digital printing technique, such as inkjet printing or laser printing. The use of digital printing techniques improves the applicability of the process and allows a higher degree flexibility of the print patterns that can be applied on the substrate as compared to analogue printing techniques such as screen printing and intaglio printing. Another advantage of using digital printing techniques is that the print pattern can be adapted depending on the substrate and/or on the preferences of a client. If, for example, the substrate comprises a wood-based material such as an essentially unprocessed wood material, e.g. a wood panel, the natural wood pattern of the substrate can be scanned using an optical and/or laser scanning system, after which the print pattern, which will be applied to the substrate using a digital printing technique, may be selected and adapted according to the wood patterns which are scanned and/or in accordance with the preference of a client. The devices used for the digital printing, for example an inkjet printer or laser printer, may be provided with software that contains a database comprising, for example, different types of wood patterns. For instance if a client desires more knots in the wood pattern, the software searches its database and fits the additional effect to the scanned wood panel. The database may comprise different types of decor designs, such as knots, wood-veins, "flat" appearing designs, "weatherworn" appearing designs, which may be applied on the substrate on-the-fly and randomly allowing a very broad variety of different wood structures to be obtained. Preferably, the optical and/or laser scanning system is placed before the print pattern application step, hereby making it possible to apply the print pattern in-line, customized to the substrate and/or the preference of a client. It should be noted that the example is hereby given to provide a (wood-based) substrate with a "wood-like" appearance, but the same principle can be applied for other decor designs, such as stone designs, etc. and other types of substrates, which may comprise different materials than wood-based materials. Preferably, the print pattern is applied to the substrate in the same production line in which the substrate is produced or shortly after the production step of the substrate. This will increase the overall flexibility of the process and may allow that the print pattern can be adapted depending on the substrate.

In one embodiment, the print pattern is applied using inkjet printing. Any type of colorant may be used that can be applied on a substrate using inkjet printing. Preferably, a UV ink is used for the inkjet printing, whereby right after applying droplets of UV ink in a desired pattern with the inkjet printer, the droplets are preferably at least partially cured using UV light. This will prevent further spreading of the droplets over the substrate and allows a rapid fixation of the print on the substrate. In another embodiment, the print pattern is applied using laser printing. Similar as using inkjet printing in combination with UV inks, laser printing will allow a rapid fixation of the print on the substrate, thereby inhibiting over-spreading of the colorants on the substrate, and thus allowing a sharp and high quality print pattern to be obtained on the substrate.

In one embodiment, the surface of the substrate onto which the print pattern is to be applied, is pre-treated prior to the application of the print pattern. With pre-treated, it is meant that the surface of the substrate may be treated to promote adhesion or bonding between the substrate and the print pattern. For example, the surface of the substrate may be planed, grooved, scored, roughened, sanded, may be treated with a plasma or corona treatment, etc. to promote chemical and/or mechanical adhesion of the print pattern or to provide a structure to the surface of the substrate which will contribute to an improved design (look and/or feel). Further, the term "pre-treated" preferably also encompasses that at least one colorant may be applied on the surface of the substrate onto which the print pattern is to be applied.

In one embodiment, at least one colorant is applied on the surface of the substrate onto which the print pattern is to be applied, prior to the application of the print pattern. In a preferred embodiment, the colorant is provided on the entire surface of the substrate onto which the print pattern is to be applied. This will provide the substrate with a background colour onto which the print pattern is applied, which background colour can significantly influence the appearance of the print pattern. This way, using one type of substrate, but by applying it with different background colours, a broad variety of different coverings can be obtained using the same print pattern.

After the direct application of the print pattern on the substrate, a wear layer is preferably applied on top of the printed pattern, which together with the print pattern may form a surface layer on the substrate. The wear layer can be applied by conventional techniques, such as with a curtain coater, direct roll coater, vacuum coater, differential roll coater, air knife coater, or spray apparatus. The wear layer may also be applied using printing techniques, such as, but not limited to, laser printing, inkjet printing, intaglio printing, screen printing or any combination of the previous. In one embodiment, the wear layer is produced by extrusion of at least one thermoplastic material comprising one or more colorants. Preferably, after extrusion, the wear layer is applied to the substrate using any type of technique known in the art such as, for example, using adhesives or by using hot pressing. The thermoplastic material can comprise any type of thermoplastic material known in the art, similar as described above. In a preferred embodiment, the thermoplastic material comprises a polyvinyl chloride-based material. During the extrusion, other components may be added to the at least one extruded thermoplastic material of the wear layer, such as, but not limited to, wood fibres or wood particles, fillers, plasticizer, stabilizers, flame retardants, antistatic agents, wear resistant agents, antimicrobial additives, processing aids, dispersion additives, lubricants, modifying resins, cross-linking agents, antioxidants, foaming agents, tackifiers, etc.

One or more colorants may be distributed throughout said thermoplastic material in any kind of manner, such as for example in a uniform manner, in order to obtain a wear layer provided with a uniform colour, or in a non-uniform manner to, for example, yield a variegated pattern. To yield a variegated pattern, different colorants with a slightly different melting point may be added to the thermoplastic material, for example before extrusion, to create different spots, shadings, patterns, etc. throughout the wear layer. It should be readily appreciated that different colorants may be distributed throughout the thermoplastic material in a uniform or non-uniform manner, or a combination of both to yield a desired wear layer. In one example, the colorant can be added by means of colorant beads which upon processing (e.g. extrusion) burst and spread the colorant as the thermoplastic material is being processed. By providing the wear layer with a certain kind of colour and/or with a certain kind of coloured pattern on its surface and throughout its structure, the thermoplastic material can already substantially be given the appearance or base colour of a desired final covering material, such as for example a wood-like material or the thermoplastic material may so influence the appearance of the print pattern applied on the substrate.

In one embodiment, the wear layer is produced by co-extruding two or more thermoplastic materials, preferably of which at least one of the thermoplastic materials comprises one or more colorants.

In one embodiment, both the substrate and the wear layer are produced by extruding at least one thermoplastic material comprising one or more colorants, using similar embodiments, configuration, materials, etc. as described above for the substrate and wear layer separately, whereby a print pattern is directly provided on the substrate. Preferably, after extrusion, the wear layer is applied to the substrate using any type of technique known in the art such as, for example, using adhesives or by using hot pressing. Preferably, at least one colorant is distributed non-uniformly throughout said wear layer and said substrate to yield a variegated pattern, such as for example to obtain a wear layer and substrate that substantially have the appearance of a wood-like material. By "tuning" the appearance of both the substrate and the wear layer using colorants, a large amount of different covering configurations with different colour patterns can be obtained, without the necessity of applying additional pre-coatings.

In one example, the substrate and/or the wear layer are produced by extrusion of at least one thermoplastic material, which thermoplastic material comprises two or more different colorants with a slightly different melting point and which are added to the at least one thermoplastic material before extrusion, to create different colour spots and shadings in the substrate and/or wear layer, whereby a print pattern is directly provided on the substrate. The mixture of colorants may be predefined using desired colorant variations through precise timing when the colorants are added to the thermoplastic material for extrusion or may be distributed throughout the substrate and/or the wear layer in a uniform manner.

In one embodiment, at least one additional top wear layer is applied on the surface layer. Such additional top wear layer may comprise similar embodiments, configurations, materials, etc. as described above for the wear layer. In a preferred embodiment, the additional top wear layer comprises a transparent polyvinyl chloride layer or a transparent urethane or acrylate UV-curable coating. The additional top wear layer can have several advantages such as an increased wear resistance against scratching, by allowing the covering to be more easily cleansed and/or by making the covering more mat. In one embodiment, at least one additional print pattern is applied to the surface layer, which may have the same or a different pattern as the print pattern comprised in the surface layer. In one embodiment, at least one additional print pattern and at least one additional top wear layer is applied to the surface layer, which may be applied to the surface layer in any type of order, i.e. first an additional print layer, then an additional top wear layer or vice versa. Preferably, the last layer applied is an additional top wear layer. In a preferred embodiment, the covering is provided with any of a bevel or a locking system, whereby said print pattern is extended onto said bevel and/or said locking system.

In one embodiment, the covering panels are provided with an embossing pattern prior to and/or after applying the surface layer. The embossing pattern is preferably in register with the print pattern. To provide the covering with an embossing pattern any kind of mechanical or chemical embossing technique known in the art may be used as well as any combination of mechanical or chemical embossing techniques. Preferably, the embossing pattern provided to the covering has an embossing depth of up to about 1000 μm, and preferably up to about 750 μm.

The invention is further described by the following non-limiting examples which further illustrate the invention, and are not intended to, nor should they be interpreted to, limit the scope of the invention.

Example 1

In a first example, the covering is a covering panel comprising a rigid substrate which comprises a core with a top surface and bottom surface as well as side surfaces. The substrate comprises an extruded PVC material with a colorant distributed uniform throughout the substrate. The substrate has a thickness of about 5 mm. A print pattern is directly applied on the substrate on the top surface. A wear layer is provided on the print pattern on the top surface of the substrate, which wear layer is an acrylated urethane based UV-curable layer. The print pattern and the wear layer together form a surface layer on the top surface of the substrate.

The covering of example 1 was made by first producing the substrate by extruding PVC whereby a colorant was added during the extrusion process to provide the substrate with a uniform colour, after which a print pattern was directly applied on the top surface using an inkjet printing technique with UV inks. About 8 mL UV ink per m² substrate was applied. After application of the print pattern, the inks were cured using UV light to allow a proper adherence of the print pattern to the substrate. After application of the print pattern, an acrylated urethane based UV-curable wear layer was provided on the print pattern on the top surface of the substrate, after which the wear layer was UV cured.

Example 2

The covering of example 2 is similar to the covering of example 1 and produced in a similar fashion, but the bottom surface of the substrate is sanded.

The covering of example 2 was made by first producing the substrate by extruding PVC whereby a colorant was added during the extrusion process to provide the substrate with a uniform colour. After extrusion, the bottom surface of the substrate was sanded, after which a print pattern was directly applied on the top surface using an inkjet printing technique with UV inks.

Example 3

The covering of example 3 is similar to the covering of example 1 and produced in a similar fashion, but it is provided with an embossing pattern. This embossing pattern was provided to the covering by providing the substrate, prior to applying the print pattern to the substrate, with the embossing pattern using a mechanical embossing technique.

Example 4

The covering of example 4 is similar to the covering of example 1 and produced in a similar fashion. The substrate has a thickness of about 5 mm. The substrate is provided with a white print pattern on the top surface of the substrate, to provide it with an overall white appearance. A coloured print pattern is applied on the top surface of the substrate (comprising the white print pattern). The presence of the white print pattern allows to tune the contrast and the appearance of the coloured print pattern applied to the substrate. A wear layer is provided on the print patterns on the top surface of the substrate, which wear layer is a thermally cured lacquer. The print patterns and the wear layer together form a surface layer on the top surface of the substrate.

The covering of example 4 was produced in a similar fashion as example 1. After extrusion, a white print pattern was applied to the substrate on the top surface using inkjet printing with UV inks. About 20 mL UV ink per m² substrate was provided with the white print pattern. Next, using the same inkjet printing device, a coloured print pattern was applied on the top surface comprising the white print pattern.

About 8 mL UV ink per m² substrate was provided with the coloured print pattern. After application of the print patterns, the inks were cured using UV light to allow a proper adherence of the print pattern to the substrate, after which a thermally curable wear layer was provided on the print pattern on the top surface of the substrate, after which the wear layer was cured using heat.

Example 5

The covering of example 5 is similar to the covering of example 4, but the coloured print pattern is also applied to the bottom surface of the substrate.

Example 6

The covering of example 6 is a covering panel comprising a rigid substrate which comprises a core with a top surface and bottom surface as well as side surfaces. The substrate comprises an extruded PVC material with a colorant distributed uniform throughout the substrate. The substrate has a thickness of about 5 mm. The substrate is further provided with a bevel and a locking system on the side surfaces of the substrate. A print pattern is directly applied on the substrate on the top surface, bottom surface, and bevel and locking system. A wear layer is provided on the print pattern on the top surface of the substrate, which wear layer is an acrylated urethane based UV-curable layer. The print pattern and the wear layer together form a surface layer on the top surface of the substrate.

The covering of example 6 was made by first producing the substrate by extruding PVC whereby a colorant was added during the extrusion process to provide the substrate with a uniform colour. After extrusion, the substrate was provided with a bevel and a locking system on the sides of the substrate using several milling steps, after which a print pattern was applied on the substrate on the top surface, bottom surface and bevel and locking system using an inkjet printing technique with UV inks. About 8 ml UV ink per m² substrate was applied to the substrate. After application of the print pattern, the inks were cured using UV light to allow a proper adherence of the print pattern to the substrate. After application of the print pattern, an acrylated urethane based UV-curable wear layer was provided on the print pattern on the top surface of the substrate, after which the wear layer was UV cured.

Example 7

The covering of example 7 is a covering panel comprising a rigid substrate which comprises a core with a top surface and bottom surface as well as side surfaces. The substrate comprises a high-density fibreboard material. The substrate has a thickness of about 8 mm. The substrate is further provided with a bevel and a locking system on the side surfaces of the substrate. A print pattern is directly applied on the substrate on the top surface. A wear layer is provided on the print pattern on the top surface of the substrate, which wear layer is an acrylated urethane based UV-curable layer. The print pattern and the wear layer together form a surface layer on the top surface of the substrate.

The covering of example 7 was made by first providing the high-density fibreboard substrate with a bevel and a locking system on the side surfaces of the substrate using several milling steps, after which a print pattern was applied on the substrate on the top surface using an inkjet printing technique with UV inks. About 15 mL UV ink per m² substrate was applied to the substrate. After application of the print pattern, the inks were cured using UV light to allow a proper adherence of the print pattern to the substrate. After application of the print pattern, an acrylated urethane based UV-curable wear layer was provided on the print pattern on the top surface of the substrate, after which the wear layer was UV cured.

Example 8

The covering of example 8 is similar to the covering of example 7, but the print pattern is extended to the bevel and locking system of the substrate.

Example 9

The covering of example 9 is a covering panel comprising a rigid substrate which comprises a core with a top surface and bottom surface as well as side surfaces. The substrate comprises a high-density fibreboard material. The substrate has a thickness of about 8 mm. The substrate is further provided with a bevel and a locking system on the side surfaces of the substrate. The substrate is provided with a white print pattern on the top surface of the substrate, to provide it with an overall white appearance. A coloured print pattern is applied on the top surface of the substrate, comprising the white print pattern. The presence of the white print pattern allows to tune the contrast and the appearance of the coloured print pattern applied to the substrate. A wear layer is provided on the print patterns on the top surface of the substrate, which wear layer is an acrylated urethane based UV-curable layer. The print patterns and the wear layer together form a surface layer on the top surface of the substrate.

The covering of example 9 was made by first providing the high-density fibreboard substrate with a bevel and a locking system on the side surfaces of the substrate using several milling steps, after which a white print pattern was applied to the substrate on the top surface using inkjet printing with UV inks. About 20 mL UV ink per m² substrate was provided with the white print pattern. Next, using the same inkjet printing device, a coloured print pattern was applied on the top surface comprising the white print pattern. About 8 mL UV ink per m² substrate was provided with the coloured print pattern. After application of the print patterns, the inks were cured using UV light to allow a proper adherence of the print pattern to the substrate, after which an acrylated urethane based UV-curable wear layer was provided on the print patterns on the top surface of the substrate, after which the wear layer was UV cured.

Example 10

The covering of example 10 is similar to the covering of example 9, but the coloured print pattern is also applied to the bottom surface of the substrate.

Example 11

The covering of example 11 is similar to the covering of example 9, but the coloured print pattern is also applied to the bevel and locking system and to the bottom surface of the substrate.

Example 12

The covering of example 12 is a covering panel comprising a rigid substrate which comprises a core with a top surface and bottom surface as well as side surfaces. The substrate comprises a high-density fibreboard material. The substrate has a thickness of about 8 mm. The substrate is further provided with a bevel and a locking system on the side surfaces of the substrate. A print pattern is directly applied on the substrate on the top surface. A wear layer is provided on the print pattern on the top surface of the substrate, which wear layer is an acrylated urethane based UV-curable layer. The print pattern and the wear layer together form a surface layer on the top surface of the substrate.

The covering of example 12 was made by scanning a natural wood pattern using a laser scanning system, after which a desired print pattern, which is to be applied to the high-density fibreboard substrate, was selected and digitally adapted according to the wood patterns which were scanned, e.g. new knots, wood-veins, etc. were added to the wood pattern of the natural wood pattern depending on the preferences of a client. Then, this scanned and digitally adapted print pattern was applied to the high-density fibreboard substrate on the top surface using an inkjet printing technique. About 7 mL of UV-curable ink per $m^2$ substrate was applied to the substrate. After application of the print pattern, an acrylated urethane based UV-curable wear layer was provided on the print pattern on the top surface of the substrate, after which the wear layer was UV cured.

Example 13

The covering of example 13 is a covering panel comprising a flexible substrate which comprises a top surface and bottom surface. The substrate comprises a flexible vinyl material. A print pattern is directly applied on the substrate on the top surface. A wear layer is provided on the print pattern on the top surface of the substrate, which wear layer is a thermally curable lacquer layer. The print pattern and the wear layer together form a surface layer on the top surface of the substrate.

The covering of example 13 was made by first providing a natural wood material. Then, the natural wood pattern of the material was scanned using a laser scanning system, after which a desired print pattern, which is to be applied to the flexible vinyl material, was selected and digitally adapted according to the wood patterns which were scanned, e.g. new knots, wood-veins, etc. were added to the wood pattern of the scanned wood patterns depending on the preferences of a client. Then, this scanned and digitally adapted print pattern was applied to the flexible vinyl material on the top surface using a laser printing technique. About 5 mL ink per $m^2$ substrate was applied to the substrate. After application of the print pattern, an acrylated urethane based UV-curable wear layer was provided on the print pattern on the top surface of the substrate, after which the wear layer was UV cured.

It is supposed that the present invention is not restricted to any form of realization described previously and that some modifications can be added to the presented example of fabrication without reappraisal of the appended claims.

The invention claimed is:

1. Covering panel configured as a floor covering, wall covering or ceiling covering, said covering panel comprising:
   at least one substrate comprising natural wood;
   a surface of the natural wood comprising a print pattern;
   wherein said print pattern is directly printed on the wood of the substrate by laser printing, inkjet printing, intaglio printing, screen printing or a combination thereof, using a least one colorant wherein the colorant comprises a water-based or an organic solvent-based colorant, wherein the wood of the substrate comprises a nerve structure, wherein the print pattern improves, enhances or highlights the nerve structure, the covering panel further comprising a wear layer on the printed natural wood.

2. Covering panel according to claim 1, wherein said wear layer comprises a colorant which is uniformly distributed throughout said wear layer.

3. Covering panel according to claim 1, wherein said wear layer comprises a colorant which is non-uniformly distributed throughout said wear layer.

4. Covering panel according to claim 1, wherein said wear layer comprises an acrylated urethane-based UV-curable layer.

5. Covering panel according to claim 1, whereby said covering panel comprises a bevel or a locking system, wherein the natural wood with said print pattern is extended onto said bevel and/or said locking system.

6. Covering according to claim 1, whereby said covering panel is provided with an embossing pattern.

7. Covering according to claim 6, whereby said embossing pattern is in register with said print pattern.

8. Method for producing covering panels, configured as a floor covering, wall covering or ceiling covering, comprising the steps of:
   providing a substrate comprising a natural wood;
   applying to the wood of the substrate, a print pattern and a wear layer;
   wherein said print pattern is ink directly printed on the natural wood of the substrate by laser printing, inkjet printing, intaglio printing, screen printing or a combination thereof, using a least one colorant,
   wherein the colorant comprises a water-based or an organic solvent-based colorant, wherein the wood of the substrate comprises a nerve structure, wherein the print pattern improves, enhances or highlights the nerve structure.

9. Method according to claim 8, whereby said covering is provided with any of a bevel or a locking system, whereby the natural wood with said print pattern is extended onto said bevel and/or said locking system.

10. Method according to claim 8, comprising the step of:
   scanning the surface of the substrate onto which the print pattern is to be applied, using an optical and/or laser scanning system.

* * * * *